(12) United States Patent
Sadacharam et al.

(10) Patent No.: US 11,159,798 B2
(45) Date of Patent: Oct. 26, 2021

(54) VIDEO COMPRESSION USING COGNITIVE SEMANTICS OBJECT ANALYSIS

(71) Applicant: International Business Machines Corporation, Armonk, NY (US)

(72) Inventors: Saravanan Sadacharam, Chennai (IN); Vijay Kumar Ananthapur Bache, Bangalore (IN); Vijay Ekambaram, Chennai (IN); Jhilam Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 16/106,858

(22) Filed: Aug. 21, 2018

(65) Prior Publication Data

US 2020/0068199 A1 Feb. 27, 2020

(51) Int. Cl.
*H04N 19/142* (2014.01)
*H04N 19/44* (2014.01)
*G06K 9/62* (2006.01)
*G06K 9/00* (2006.01)
*H04N 19/87* (2014.01)
*H04N 19/23* (2014.01)

(52) U.S. Cl.
CPC ....... *H04N 19/142* (2014.11); *G06K 9/00718* (2013.01); *G06K 9/6202* (2013.01); *H04N 19/23* (2014.11); *H04N 19/44* (2014.11); *H04N 19/87* (2014.11)

(58) Field of Classification Search
None
See application file for complete search history.

(56) References Cited

U.S. PATENT DOCUMENTS

| | | | | |
|---|---|---|---|---|
| 5,259,040 A | * | 11/1993 | Hanna | G06K 9/209 375/240.12 |
| 5,532,833 A | * | 7/1996 | Hong | G11B 17/005 386/241 |
| 5,734,843 A | * | 3/1998 | Gephardt | G06F 13/36 710/107 |

(Continued)

FOREIGN PATENT DOCUMENTS

WO WO2016095023 6/2016

OTHER PUBLICATIONS

N. Karimi, S. Samavi, S. Shirani, A. Banaei, E. Nasr-Esfahani, Real-time lossless compression of microarray images by separate compaction of foreground and background, Computer Standards & Interfaces, vol. 39,2015, pp. 34-43 (Year: 2015).*

(Continued)

*Primary Examiner* — Stefan Gadomski
(74) *Attorney, Agent, or Firm* — Schmeiser, Olsen & Watts, LLP; William Hartwell

(57) ABSTRACT

A method, and associated computer system and computer program product, for video compression that includes receiving a video file including a plurality of frames, identifying at least one image feature in each of the plurality of frames, determining a semantic state change of the image feature for each successive frame after a first of the plurality of frames, and storing the first of the plurality of frames and the semantic change of the image feature for each successive frame after the first of the plurality of frames.

20 Claims, 9 Drawing Sheets

(56) References Cited

U.S. PATENT DOCUMENTS

| | | | | |
|---|---|---|---|---|
| 5,777,690 A * | 7/1998 | Takeda | G01S 11/12 | 348/155 |
| 6,351,493 B1 * | 2/2002 | Reed | H04N 19/503 | 348/700 |
| 6,546,115 B1 * | 4/2003 | Ito | G08B 13/19602 | 348/169 |
| 6,687,386 B1 * | 2/2004 | Ito | G06K 9/00785 | 382/103 |
| 9,274,597 B1 * | 3/2016 | Karakotsios | G06F 3/0346 | |
| 9,454,819 B1 * | 9/2016 | Seetharaman | G06K 9/6277 | |
| 9,883,120 B2 * | 1/2018 | Adsumilli | G06T 7/174 | |
| 9,961,297 B2 * | 5/2018 | Lawrence | H04N 5/92 | |
| 10,395,119 B1 * | 8/2019 | Vaden | G06K 9/00718 | |
| 10,491,963 B1 * | 11/2019 | Waggoner | H04N 21/234345 | |
| 2002/0178453 A1 * | 11/2002 | Jun | H04N 5/9262 | 725/88 |
| 2003/0161534 A1 * | 8/2003 | Loce | G06K 9/4609 | 382/209 |
| 2003/0189670 A1 * | 10/2003 | Kennedy | H04N 21/44008 | 348/601 |
| 2004/0078805 A1 * | 4/2004 | Brian | H04N 7/18 | 725/1 |
| 2004/0223050 A1 * | 11/2004 | Callaci | H04N 19/132 | 348/14.08 |
| 2004/0228530 A1 * | 11/2004 | Schwartz | G06K 9/38 | 382/173 |
| 2005/0129323 A1 * | 6/2005 | Glickman | H04N 19/96 | 382/240 |
| 2006/0147116 A1 * | 7/2006 | Le Clerc | G06K 9/38 | 382/173 |
| 2007/0116365 A1 * | 5/2007 | Kloer | G06K 9/6228 | 382/190 |
| 2008/0050025 A1 * | 2/2008 | Bashyam | H04N 19/129 | 382/238 |
| 2008/0130948 A1 * | 6/2008 | Ozer | G06K 9/3241 | 382/103 |
| 2008/0152235 A1 * | 6/2008 | Bashyam | H03M 7/3071 | 382/224 |
| 2009/0016599 A1 * | 1/2009 | Eaton | G06N 20/00 | 382/159 |
| 2009/0185750 A1 * | 7/2009 | Schneider | H04N 19/17 | 382/235 |
| 2009/0257621 A1 * | 10/2009 | Silver | G06K 9/6202 | 382/103 |
| 2009/0304231 A1 * | 12/2009 | Lu | G06K 9/3233 | 382/103 |
| 2009/0313270 A1 * | 12/2009 | Aust | G06N 5/02 | |
| 2010/0171691 A1 * | 7/2010 | Cook | G06F 1/1613 | 345/156 |
| 2010/0303150 A1 * | 12/2010 | Hsiung | H04N 19/12 | 375/240.08 |
| 2011/0026610 A1 * | 2/2011 | Stevens | G11B 27/034 | 375/240.26 |
| 2011/0075842 A1 * | 3/2011 | Le Barz | H04N 19/503 | 380/212 |
| 2011/0102634 A1 | 5/2011 | Pardue et al. | | |
| 2011/0267544 A1 * | 11/2011 | Mei | G06K 9/00751 | 348/700 |
| 2012/0133730 A1 * | 5/2012 | Ino | H04N 5/23245 | 348/36 |
| 2013/0128078 A1 * | 5/2013 | Song | H04N 5/2251 | 348/231.99 |
| 2013/0251033 A1 | 9/2013 | Kalapodas | | |
| 2013/0279598 A1 * | 10/2013 | Gomes | H04N 19/23 | 375/240.24 |
| 2013/0342671 A1 * | 12/2013 | Hummel | G06K 9/6202 | 348/77 |
| 2014/0050411 A1 * | 2/2014 | Lee | G06K 9/4671 | 382/201 |
| 2014/0362930 A1 * | 12/2014 | Brockmann | H04N 19/103 | 375/240.26 |
| 2015/0030252 A1 * | 1/2015 | Corso | G06K 9/00744 | 382/197 |
| 2015/0103163 A1 * | 4/2015 | Won | G06T 7/269 | 348/140 |
| 2015/0297949 A1 * | 10/2015 | Aman | G06T 7/246 | 348/157 |
| 2016/0004929 A1 * | 1/2016 | Varghese | G06K 9/00771 | 382/103 |
| 2016/0150231 A1 * | 5/2016 | Schulze | H04N 19/132 | 375/240.12 |
| 2016/0150235 A1 * | 5/2016 | Schulze | H04N 19/50 | 375/240.02 |
| 2016/0173882 A1 * | 6/2016 | Mishra | H04N 19/136 | 375/240.08 |
| 2016/0196802 A1 * | 7/2016 | Nho | G09G 3/20 | 345/212 |
| 2016/0219281 A1 * | 7/2016 | Yoshikawa | H04N 19/167 | |
| 2017/0083765 A1 * | 3/2017 | Risinger | G06K 9/6202 | |
| 2017/0091950 A1 * | 3/2017 | Munteanu | G06K 9/627 | |
| 2017/0148172 A1 * | 5/2017 | Segawa | G06T 7/254 | |
| 2017/0187983 A1 * | 6/2017 | Lawrence | H04N 5/92 | |
| 2017/0289454 A1 * | 10/2017 | Pettersson | H04N 5/23267 | |
| 2017/0358103 A1 * | 12/2017 | Shao | G01S 3/00 | |
| 2018/0101966 A1 * | 4/2018 | Lee | G06T 9/001 | |
| 2018/0144215 A1 * | 5/2018 | Shen | H04N 19/439 | |
| 2018/0173959 A1 * | 6/2018 | Shah | G06K 9/00765 | |
| 2018/0240221 A1 * | 8/2018 | Rijnders | G06T 5/10 | |
| 2018/0316858 A1 * | 11/2018 | Matsumoto | H04N 5/23238 | |
| 2018/0373964 A1 * | 12/2018 | Kondo | G06K 9/6268 | |
| 2018/0374233 A1 * | 12/2018 | Zhou | G06T 7/248 | |
| 2019/0012761 A1 * | 1/2019 | Risinger | G06K 9/00785 | |
| 2019/0049549 A1 * | 2/2019 | Tang | G01S 5/0294 | |
| 2019/0138817 A1 * | 5/2019 | Hummelshoj | G06K 9/00335 | |
| 2019/0180454 A1 * | 6/2019 | Choudhury | G06T 7/254 | |
| 2019/0238893 A1 * | 8/2019 | Covell | H04N 19/463 | |
| 2019/0320206 A1 * | 10/2019 | Alakuijala | H04N 19/124 | |
| 2019/0335103 A1 * | 10/2019 | Katsumata | H04N 5/232 | |
| 2020/0042838 A1 * | 2/2020 | Trim | G06K 9/624 | |

OTHER PUBLICATIONS

Jacob Ström, Pamela C. Cosman, Medical image compression with lossless regions of interest, Signal Processing, vol. 59, Issue 2, 1997, pp. 155-171 (Year: 1997).*

Mark S. Schmalz, "An overview of semantic compression," Proc. SPIE 7799, Mathematics of Data/Image Coding, Compression, and Encryption with Applications XII, 77990K (Sep. 14, 2010); https://doi.org/10.1117/12.864279 (Year: 2010).*

N. D. Memon and K. Sayood, "Lossless compression of video sequences," in IEEE Transactions on Communications, vol. 44, No. 10, pp. 1340-1345, Oct. 1996, doi: 10.1109/26.539775. (Year: 1996).*

Open CV Q&A forum "How to know if a camera is stationary or moving?" May 16, 2017 Accessed Jul. 15, 2021 (Year: 2017).*

Well, Peter et al.; "The NIST Definition of Cloud Computing;" National Institute of Standards and Technology; Special Publication 800-145; Sep. 2011; 7 pages.

A method for compressing movie by keeping a high resolution frame per person; Authors et al.: Disclosed Anonymously; IP.com No. IPCOM000247012D; IP.com Electronic Publication Date: Jul. 26, 2016; 2 pages.

How Does H.264 Work?; Salient Systems White Paper; 2012 Salient Systems Corporation; Author Brian Carle is the Director of Product Strategy for Salient Systems Corporation; 7 pages.

A method for compressing movie by black out background; Authors et al.: Disclosed Anonymously; IP.com No. IPCOM000247011D; IP.com Electronic Publication Date: Jul. 26, 2016; 2 pages.

* cited by examiner

US 11,159,798 B2

VIDEO COMPRESSION USING COGNITIVE SEMANTICS OBJECT ANALYSIS

TECHNICAL FIELD

The present invention relates to systems and methods for video compression. More specifically, the invention relates to systems and methods for effective compression of videos using cognitive semantics object analysis.

BACKGROUND

Digital camera resolution continues to improve. Digital cameras are currently capable of communicating with other internet of things (IoT) devices, such as motion sensors, light sensors, door sensors, etc. These communications with other devices may help to generate even higher resolution data associated with image or video capture. The higher the camera resolution, the greater the digital storage requirements for storing the data associated with images and videos being captured. As a result, storage requirements associated with digital cameras has increased. With increased storage, the need for compressing data files to reduce total storage space has also increased.

SUMMARY

An embodiment of the present invention relates to a method, and associated computer system and computer program product, for video compression. One or more processors of a computing system receives a video file including a plurality of frames. The one or more processors of the computing system identifies at least one image feature in each of the plurality of frames. The one or more processors of the computing system determines a semantic state change of the image feature for each successive frame after a first of the plurality of frames. The one or more processors of the computing system stores the first of the plurality of frames and the semantic change of the image feature for each successive frame after the first of the plurality of frames.

DETAILED DESCRIPTION

Lossless compression has presented a way for data to be compressed into a state that requires less storage space but allows the original data to be perfectly reconstructed. Lossless compression is particularly applicable to video data storage captured by digital cameras. Lossless compression for video files can be divided into two parts—compression at the frame level and compression at the bit information level. Existing compression solutions, such as for example mpeg4 video files, do a comparison between successive frames and store delta or change information related to the differences between one frame and the next frame. However, in instances where the digital camera perspective is not static, the entirety of a frame will be in a new position—thus, stored delta or change information related to the differences between one frame and the next frame will be maximized, reducing or eliminating the reduction of data associated with the compression.

Thus, there is a need for a lossless compression system and method that is capable of high data compression ratios when the digital camera is moving, rotating, or otherwise not static. The present invention, when practiced, will result in an improvement in data compression ratios in video compression scenarios when the camera is moving. The present invention, when practiced, will reduce the storage space required to store video files where the camera is moving. Further, the present invention is capable of being implemented in a manner that retains the original video quality during reconstruction.

Figure 1:
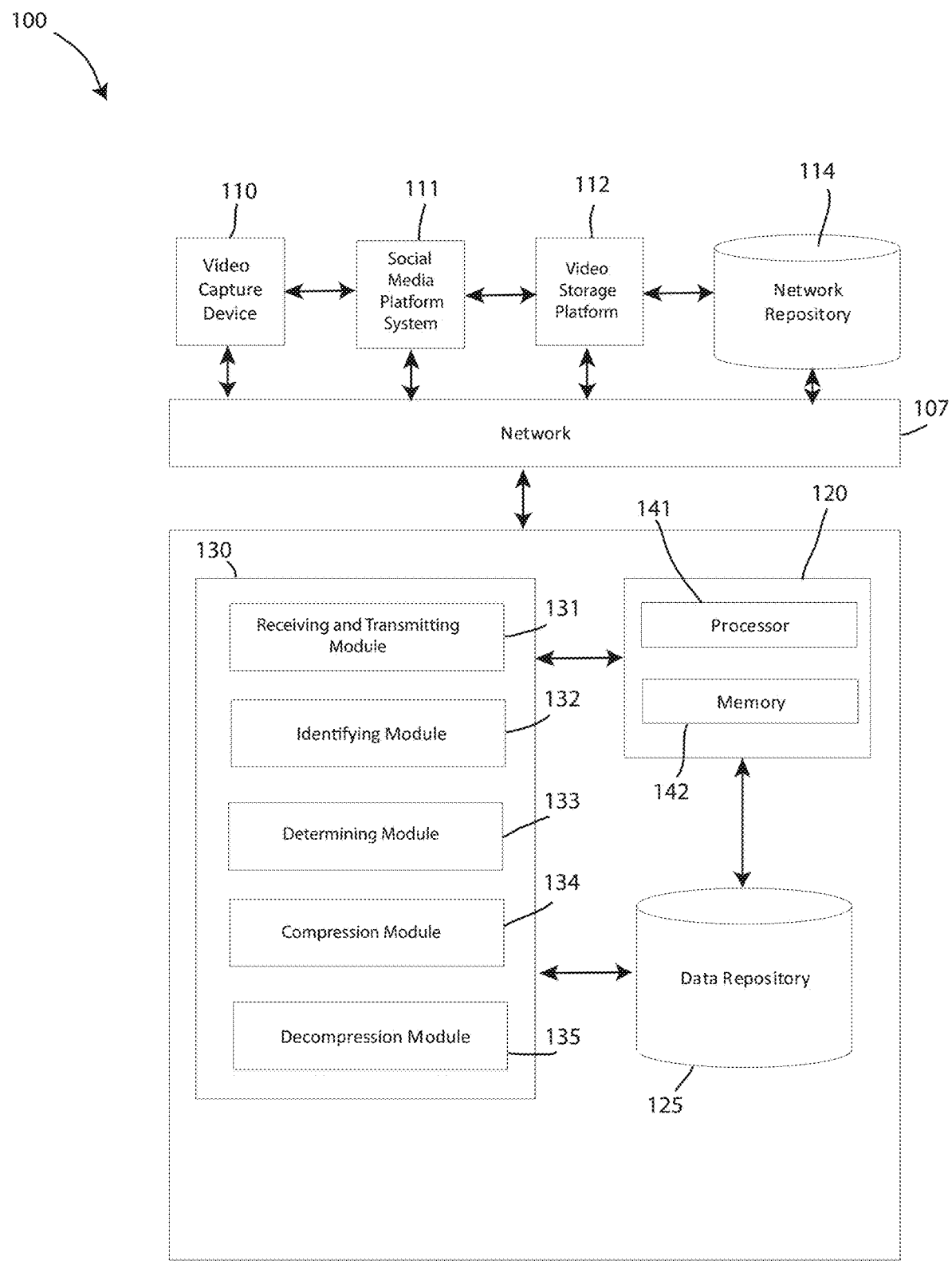
FIG. 1 depicts a block diagram of a video compression system, in accordance with embodiments of the present invention.

FIG. 1 depicts a block diagram of a video compression system 100, in accordance with embodiments of the present invention. Embodiments of the video compression system 100 may be a system for video compression, or portions thereof, conducted by a computer system 120. Embodiments of the computing system 120 may be a computer system, a computer, a server, one or more servers, a cloud computing device, a hardware device, a remote server, and the like. The video compression system 100 and/or computer system 120 may be or include a lossless video compression system. However, aspects of the invention such as the identifying of image features and the storing of semantic changes of the image features as described herein below, may also be applicable to lossy video compression systems. The video compression system 100 and/or computer system 120 may configured to reduce storage space required to store video files in situations where a camera or image capture device was moving during the capturing. Thus, the video compression system 100 and/or computer system 120 may be configured to improve data compression ratios and reduce the storage space required to store video files in situations where the background is not static or fixed.

Furthermore, embodiments of video compression system 100 may include one or more video capture devices 110, one or more social media platform systems 111, and one or more video storage platforms 112, communicatively coupled to the computing system 120 of the video compression system 100 over a network 107. For instance, information/data and/or video files containing a plurality of image frames may be transmitted to and received from the one or more video capture devices 110, one or more social media platform systems 111, and one or more video storage platforms 112 and the computer system 120 over the network 107. The network 107 may be a cloud network or system. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible repositories 114, knowledge bases or the like containing one or more video files to be compressed. The one or more network-accessible repositories 114 may further include user credentials, or the like, such as a user's SMPT mail server credentials, text chat server credentials, or other channel server credentials, social media credentials. The one or more network-accessible repositories 114 may further include information related to other systems connected to the network 107 that may be considered nodes of the network 107. In some embodiments, where the computing system 120 or network repositories allocate resources to be used by the other nodes of the network 107, the computing system 120 and network repository 114 may be referred to as servers.

The one or more network-accessible repositories 114 may be a data collection area on the network 107 which may back up and save all the data transmitted back and forth between the nodes of the network 107. For example, the one or more network-accessible repositories 114 may be a data center saving and cataloging user video capture files, user social media activity data, and the like. In some embodiments, a data collection center housing the one or more network-accessible repositories 114 may include an analytic module capable of analyzing data being stored by the network repository 114. Further, the computing system 120 may be integrated with or as a part of the data collection center housing the network repository 114. In some alternative embodiments, the network repository 114 may be a local repository that is connected to the computing system 120.

Embodiments of the one or more video capture devices 110 of the video compression system 100 may be a user device such as a camera, a video capture device, a cell phone, a smartphone, a user mobile device, a mobile computer, a tablet computer, a PDA, a smartwatch, a dedicated mobile device, a desktop computer, a laptop computer, or other internet accessible device or hardware capable of video capture. The one or more video capture devices 110 may be connected to the computer system 120 of the video compression system 100 over the network 107. The video capture devices 110 may provide captured video directly to the computer system 120, or may provide captured video to the one or more social media platforms 111 or one or more video storage platforms 112. Whatever the embodiment, video captured by the one or more video captured devices may be directly or indirectly provided to the computer system 120 for compression.

Embodiments of the one or more social media platforms 111 may include video receiving and storage capability. The social media platforms 111 may interact with the computer system 120 over the network 107 in order to perform compression on video files stored thereon. In other embodiments, the computer system 120 may be a component or feature of the one or more social media platform 111. For example, the computer system 120 and various modules thereof discussed herein below may be contained in, operated by, or otherwise controlled by the one or more social media platforms 111. In other embodiments, the one or more social media platforms 111 may communicate with the computer system 120 over the network 107 in order to perform the video compression methods described herein on video files.

Embodiments of the one or more video storage platforms 112 of the video compression system 100 may be one or more databases, storage devices, repositories, servers, computers, engines, and the like, that may service, run, store or otherwise contain video file information. The one or more video storage platforms 112 may be accessed or may share a communication link over network 107. The one or more video storage platforms 112 may be components of, operated in, or otherwise controlled by the one or more social media platforms 111 in one embodiment. In other embodiments, the video storage platforms 112 may be any other type of independent platform that stores video files in a compressed or uncompressed state. The computer system 120 may provide compressed files to the video storage platform 112 after performing some or all of the methodologies of the present invention, described herein below.

Further, embodiments of the computing system 120 may be equipped with a memory device 142 which may store various data/information/code, and a processor 141 for implementing the tasks associated with the video compression system 100. In some embodiments, a video compression application 130 may be loaded in the memory 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the video compression application 130. Embodiments of the video compression application 130 may be an interface, an application, a program, a module, or a combination of modules. In an exemplary embodiment, the video compression application 130 may be a software application running on one or more back end servers, servicing multiple computing devices.

The video compression application 130 of the computing system 120 may include a receiving and transmitting module 131, an identifying module 132, a determining module 133, a compression module 134, and a decompression module 135. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the receiving and transmitting module 131 may include one or more components of hardware and/or software program code for receiving and/or transmitting video files having a plurality of image frames. The receiving and transmitting module 131 may be configured, for example, to receive or transmit video files between the one or more video capture devices 110, the one or more social media platform systems 111 and/or the one or more video storage platforms 112, or any other device or system containing and transmitting video files. In one embodiment, the receiving and transmitting module 131 may be configured to receive video files in an uncompressed state. The computer system 120 may then be configured to compress the video files and the receiving and transmitting module 131 may be configured to transmit the compressed video file back to another device or system. In other embodiments, the computer system 120 may be configured to store compressed video files after performing compression of the video file.

Embodiments of the identifying module 132 may include one or more components of hardware and/or software program code for identifying, detecting, finding, recognizing or the like, image features located in the frames of the video file. The image features identified by the identifying module 132 may include a background of the frame, or one or more objects within the frame. A background may be characterized as a portion of the captured environment in the video file that is static or otherwise unmoving. An object may be considered a dynamic, moving thing or body located within the video file. Objects may be the focus of the captured video file. The identifying module 132 may include object or vision recognition capabilities, such as by incorporating some or all the features, software or functionality of Watson® Vision Recognition, to identify objects. The identifying module 132 may be Watson® Vision Recognition in one embodiment. The identifying module 132 may further be configured to identify or otherwise extract common objects that are found across multiple frames using the object or vision recognition capabilities or techniques. For example, the identifying module 132 may be configured to determine that an object might exist in all, most or at least above a predetermined percentage of frames.

Embodiments of the determining module 133 may include one or more components of hardware and/or software program code for determining, analyzing, evaluating, considering, and the like, a semantic change of the image features from one frame relative to the next frame. The determining module 133 may be configured to determine the semantic change across each successive frames of a video file. For example, the determining module 133 may be configured to determine semantic changes for each successive frame after a first of the plurality of frames that comprise the video file. A semantic change may be a change in orientation, rotation, position, transition, translation, or the like. A semantic change associated with an image feature may comprise a combination of orientation, rotation, position, transition, translation, and the like.

The determining module 133 may be equipped with template matching technique software that may be utilized during the determining of semantic changes of image features. For example, many template images may be stored in the data repository 125 of the computer system 120 which may be accessible by the determining module. These template images may be consulted or reviewed when identifying objects or backgrounds by the identifying module 132 or by determining semantic changes of objects or backgrounds by the determining module 133. The template matching technique may include utilizing eigenspaces or templates that detail an object under different conditions or perspectives, in order to more accurately determine semantic changes.

The determining module 133 may be configured to determine semantic changes of an object or image feature such that the exact, precise, perfect image of the object, background or other feature of a second successive frame may be determined from the information related to the previous frame plus the determined semantic changes. Thus, an accurate video across multiple frames may be compressed in a lossless form by only storing the original image of a first frame, and semantic changes representing each identified image feature across each of the successive frames in the file.

The determining module 133 may further be configured to determine location information associated with each object or background identified by the determining module 133. The location information may relate to a location of the object or background within the frame. Still further, the determining module 133 may be configured to determine whether the video capture device or camera used to capture the video file was moving during the capturing, or alternatively was in a static position during the capturing. The determining module 133 may be configured to determine whether the video capture device or camera used to capture the video file was rotating during the capturing of the video. The determining module 133 may be configured to determine whether the video capture device or camera used to capture the video file was moving forward or backward during the capturing of the video. The determining module 133 may be configured to determine whether the video capture device or camera used to capture the video file was changing orientation up to down, down to up, right to left and/or left to right, during the capturing of the video.

In some embodiments, the identifying and determining modules 132, 133 may be configured to identify image features that comprise the entirety of the video and determine semantic changes for each of those features. This may allow the identifying and determining modules 132, 133 to compress 100%, or the full entirety of every feature and portion of the video file by storing semantic changes in the above-described manner. In other embodiments, the identifying and determining modules 132, 133 may be configured to identify only a portion of the image features captured on the video file. For example, the identifying and determining modules 132, 133 may be configured to identify and store semantic changes related to a face of a person that is the focus of a video, as well as the static features of the background. However, an animal running around, or a car driving by, for example, far in the background of the frame relative to the face of the person may not be compressible in the above described manner. In other embodiments, the entirety of the image features in the video may be compressible.

Embodiments of the compression module 134 may include one or more components of hardware and/or software program code for utilizing the information provided by the identifying module 132 and determining module 133 to compress a video file. For example, the compression module 134 may be configured to store data expressing an entirety of an uncompressed first frame of a plurality of frames. The compression module 134 may be configured to store data related to each image feature, including objects and background image features identified by the identifying module 132, and semantic changes and location information associated with those image features determined by the determining module 133.

For image features identified by the identifying module 132 whose semantic states and locations in the frame are determined by the determined module 133 for each successive frame after a first frame, the compression module 134 may store only this semantic state information and location information. This may include each and every image feature in a frame, making the compression module 134 capable of compressing an entirety of an image down to only location information and semantic change information in relation to a previous frame in the video file.

If any image features are found to be incapable of identification and/or semantic states are found to be indeterminable by the identifying and determining modules 132, 133, the compression module 134 may maintain and store the original data for these features. For image features that are found to be incapable of identification and/or semantic states are found to be indeterminable by the identifying and determining modules 132, 133 in a portion of the frames that comprise the video file, the compression module 134 may maintain and store the original data for these features for the frames in which the identifying and determining modules 132, 133 were incapable of identifying and determining and otherwise providing information to the compression module 134.

Embodiments of the decompression module 135 may include one or more components of hardware and/or software program code configured to restore the video file to its original state using the information created by the compression module 134. The decompression module 135 may be configured to restore the video file to a perfectly recreated state that is an exact match of the original video file without any data loss. In other embodiments, various features of the above described system may be applicable to decompression that is not perfectly recreated and includes some loss in quality.

Figure 2:
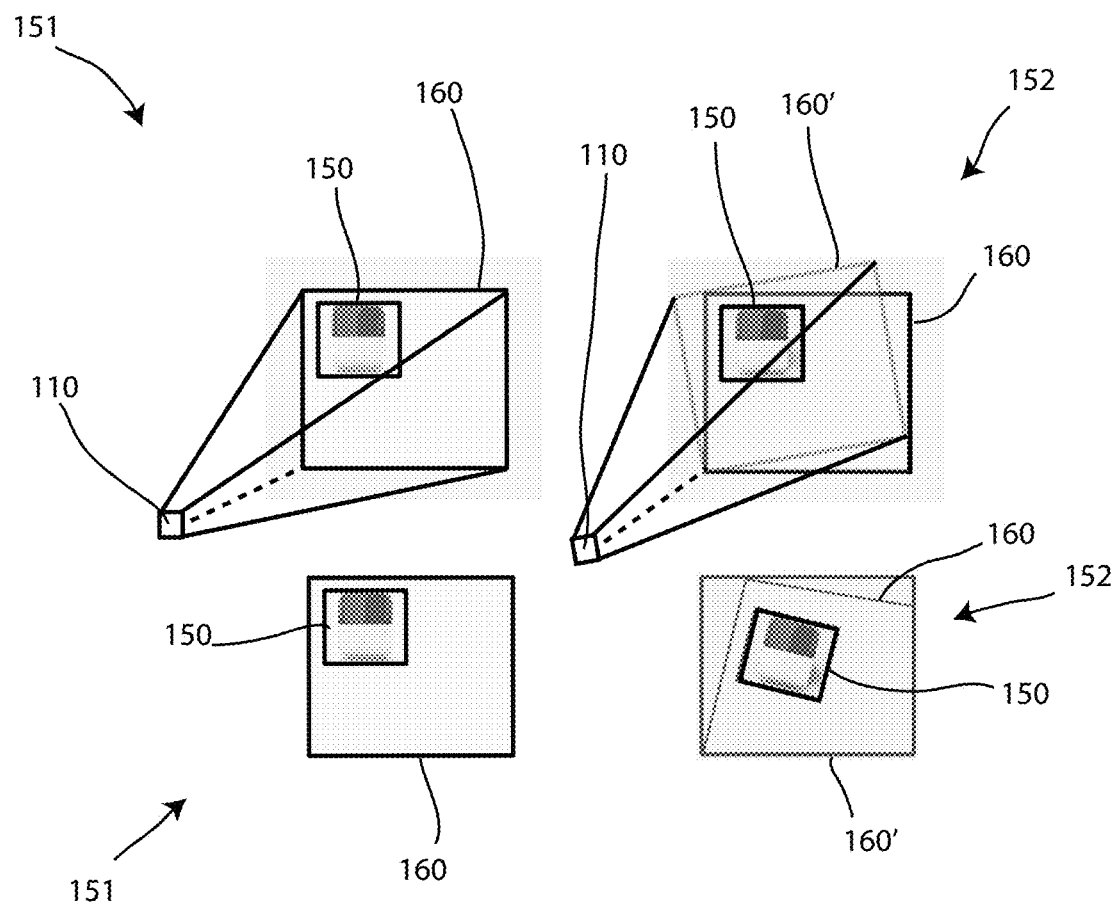
FIG. 2 depicts schematic view of a video capture with a moving video capture device, in accordance with embodiments of the present invention.

FIG. 2 depicts schematic view of a video capture scene with a moving video capture device 110, in accordance with embodiments of the present invention. The video capture scene includes a first frame 151 and a second frame 152 being captured. The first frame 151 includes image features of an object 150 and a background 160 being captured by the video capture device 110. In capturing the second frame 152, the video capture device 110 is rotated in a counter clockwise manner, relative to the position of the video capture device 110 in capturing the first frame 151, while the object 150 remains stationary. In capturing the second frame 152, a second background 160' is captured, which contains a portion of the first background 160, as shown in the bottom right image depicting the second frame 152.

FIG. 2 displays a captured video in which all or most pixels are in a new position between the first frame 151 and the second frame 152. In this situation, a typical prior art lossless compression technique would compare the first frame 151 with the second frame 152 and notice that the changes between frames are maximized. The prior art compression techniques may thus characterize each of the first frame 151 and the second frame 152 as "I Frames", or frames that are incompressible or containing an image that cannot be derived from other frames. In the present system and method for video compression, however, the second frame is compressible and can be derived from the information provided in the previous frame 151.

Figure 3:
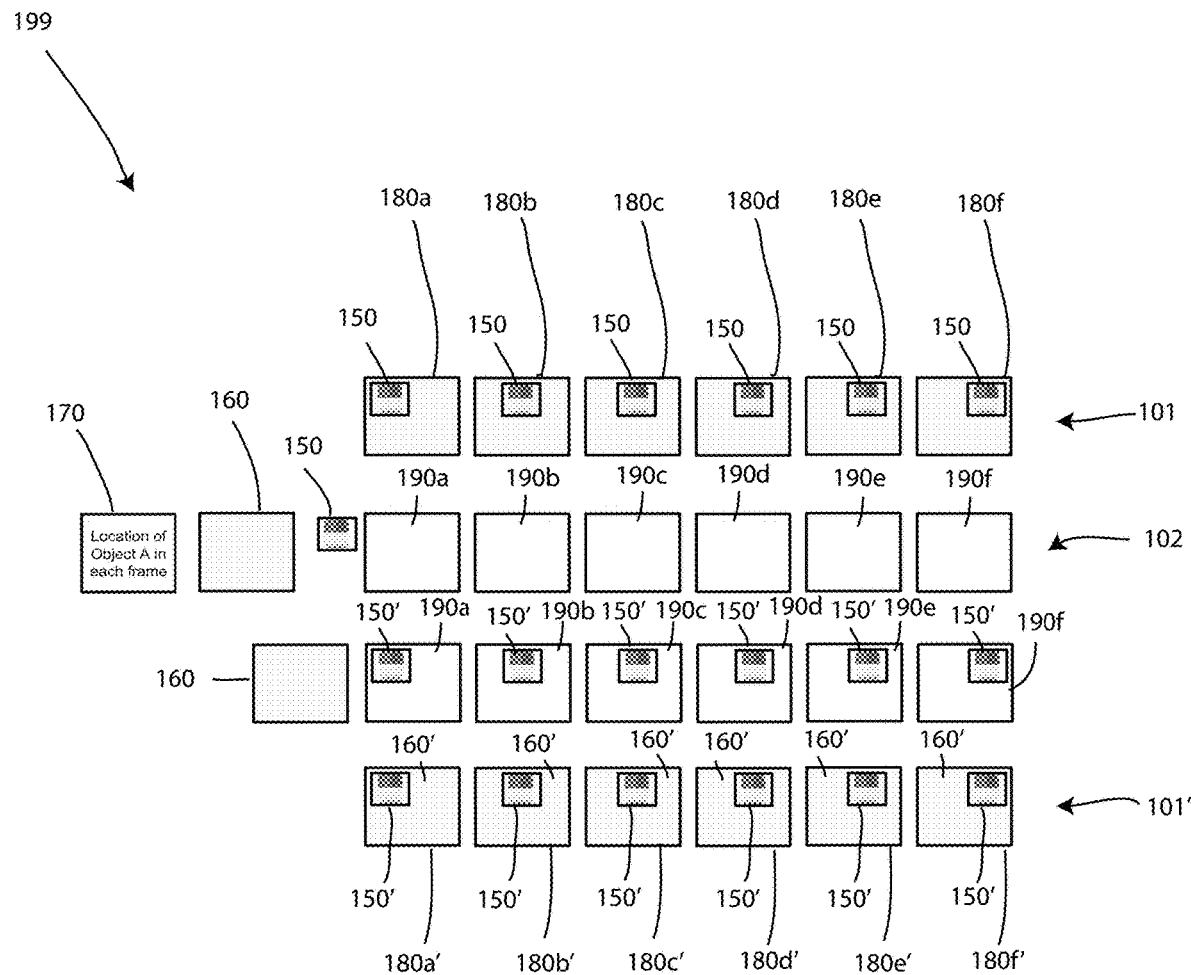
FIG. 3 depicts steps of identifying image features contained in frames of a video file and compressing the video file, in accordance with embodiments of the present invention.

FIG. 3 depicts steps of identifying image features contained in frames 180*a*, 180*b*, 180*c*, 180*d*, 180*e*, 180*f* of a video file 101 and compressing the video file 101, in accordance with embodiments of the present invention. The video file 101 may include the frames 180*a*, 180*b*, 180*c*, 180*d*, 180*e*, 180*f* which may each include an object 150 and a background 160. In this embodiment, the video capture device used to capture the scene, video or frames 180*a*, 180*b*, 180*c*, 180*d*, 180*e*, 180*f* in the video file 101 may have been static during the video capture. In this embodiment, the video compression system 100 and/or the computer system 120 may be configured to create a compressed video file 102 from the original video file 101.

The compressed video file 102 may include meta data 170 related to the location of object A in each of the frames 180*a*, 180*b*, 180*c*, 180*d*, 180*e*, 180*f*. The compressed video file 102 may further include the background 160 stored therein, for example in the data repository 125 of the computer system 120. The compressed video file 102 may further include the object 150 stored. However, the compressed video file 102 may include frame information 190*a*, 190*b*, 190*c*, 190*d*, 190*e*, 190*f* for each of the frames 180*a*, 180*b*, 180*c*, 180*d*, 180*e*, 180*f*. In one embodiment, the frame information 190*a*, 190*b*, 190*c*, 190*d*, 190*e*, 190*f* may include little or no data, as the image capture device captured the video from a static position retaining the background constant and making the only moving object in the frames the object 150.

To create the compressed video file 102, the computer system 120 may be configured to detect or identify the object 150 within the frames 180*a*, 180*b*, 180*c*, 180*d*, 180*e*, 180*f*. The detection or identification of the objects may be completed using object recognition techniques as described herein above. Once the detection of the object 150 is complete, the computer system 120 may be configured to determine that the camera or video capture device that took the video file 102 was static or fixed. Then, the determining module 133 may be configured to determine the location of the object within each of the frames 180*a*, 180*b*, 180*c*, 180*d*, 180*e*, 180*f* and store this information as the meta data 170. The compression module 134 may further be configured to store this information, along with the image of the background 160 and the object 150.

The final two rows of FIG. 3 show a decompression technique in which the decompression module 135 may be configured to recreate a copy of the original video 101' from the compressed video 102. The copy of the original video may include frames 180*a'*, 180*b'*, 180*c'*, 180*d'*, 180*e'*, 180*f'*. The first step of the decompression depicted by the second lowest row may include merging a copy of the object 150' with the frame information 190*a*, 190*b*, 190*c*, 190*d*, 190*e*, 190*f*, or otherwise placing the object 150' into each frame using the meta data 170 location information. The next step depicted by the lowest row may include placing a copy of the background 160' into the frame to create the frames 180*a'*, 180*b'*, 180*c'*, 180*d'*, 180*e'*, 180*f'*. This may complete the process of recreating the copy of the original video 101' through decompression of the compressed video file 102.

Figure 4:
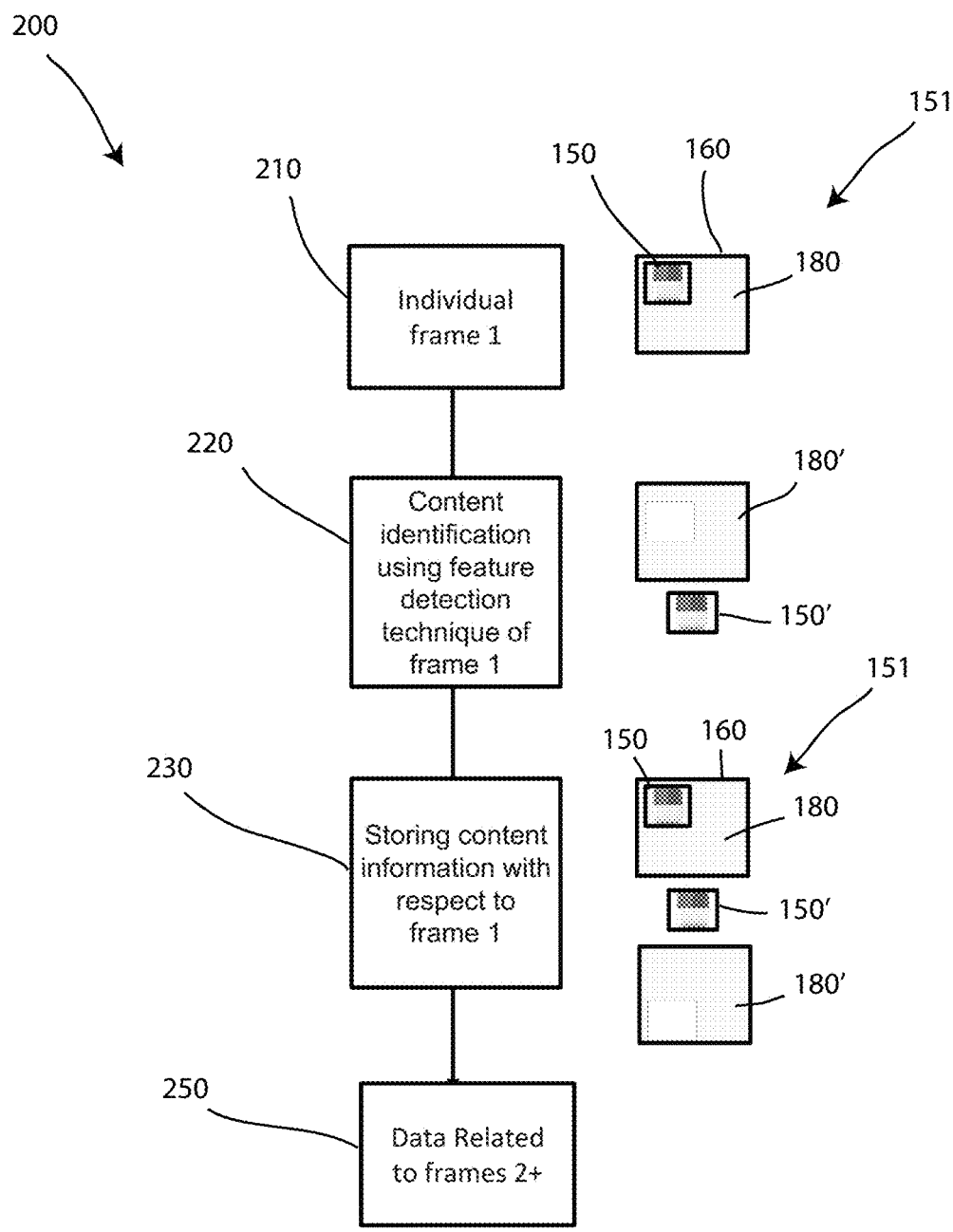
FIG. 4 depicts a method of determining and storing information related to the image features of a video file, in accordance with embodiments of the present invention.

FIG. 4 depicts a method 200 of determining and storing information related to the image features of a video file, such as the video file captured in FIG. 2, in accordance with embodiments of the present invention. The method 200 may be performed in a circumstance when the image capture device used to capture the video file was moving during the capturing. The method 200 may include a first step 210 of storing an individual first frame 151 that includes the object 150 and the background 160. The background 160 may include a portion 180 that is visible behind the object 150. The method 200 may include a second step 220 of identifying content using feature detection techniques for the frame 151. This may include separating the background portion 180' from the object 150'. The method 200 may include a third step 230 of storing content information or meta data regarding the location of each of the object 150' and the background portion 180' in the frame 151. The method 200 may include storing this information, along with the first frame 151. The method 200 may include a final step 250 of storing additional data associated with each of the other frames 152 in the video file that occur after the first frame 160.

Figure 5:
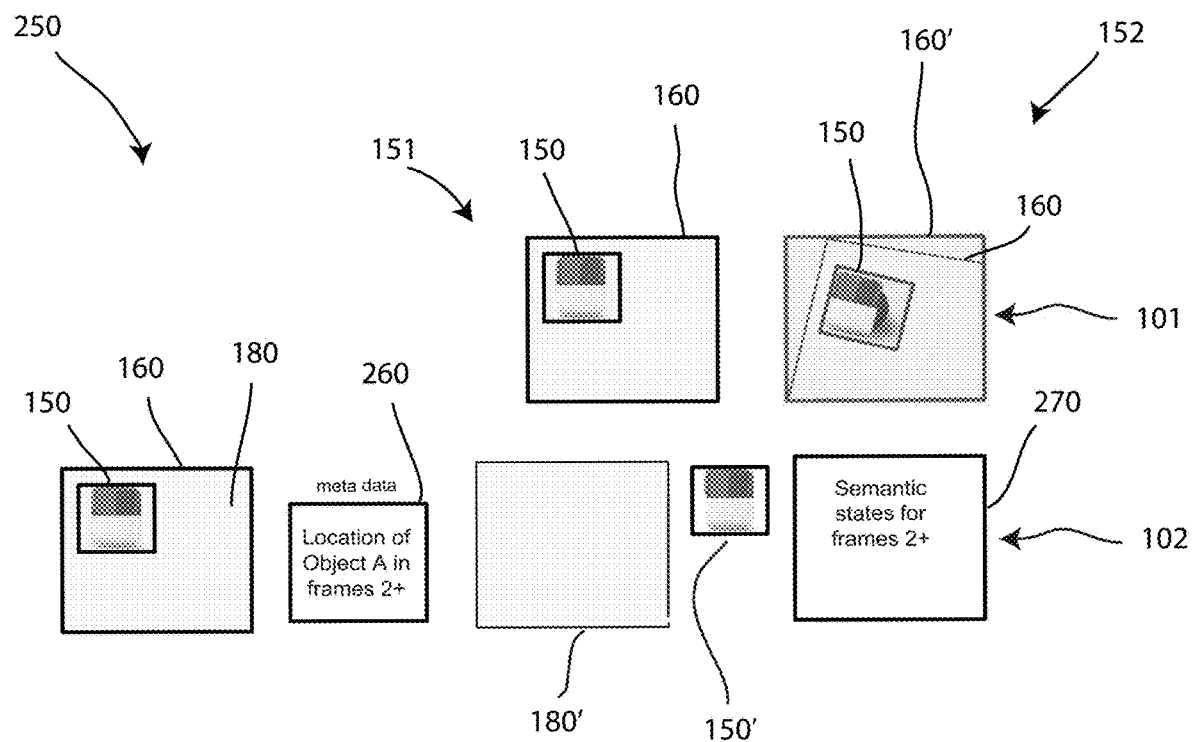
FIG. 5 depicts the step of determining and storing semantic changes related to the image features for later frames in the video file of FIG. 5, in accordance with embodiments of the present invention.

FIG. 5 depicts the step 250 of determining and storing semantic changes related to the image features for later frame(s) in the video file of FIG. 4, in accordance with the present invention. Shown in the top row of FIG. 5 is the first frame 151 and the second frame 152 captured with the video capture device 110, as shown in FIG. 2. The bottom row of FIG. 5 includes the information that is stored during the step 250 of the compression. The information may include the data related to the first frame 151 including the object 150, the background 160 including the background features 180 located behind the object 150. The information may include location information metadata 260 related to the location of the object 150 in the frames 151, 152. The information may include frame information 180' including any data or information related to the background that could not be compressed. The frame information 180' may be empty in the event that the frame information related to the background could be compressed and fully derived using the metadata stored by the compression. The information may include the object 150' taken and stored separate from the frame. Finally, the frame information may include semantic state information 270 that accounts for rotation, orientation, position, transition and/or translation, or the like, of the video capture device and background 160 and object 150 in the second frame 152 relative to the first frame 151.

Figure 6:
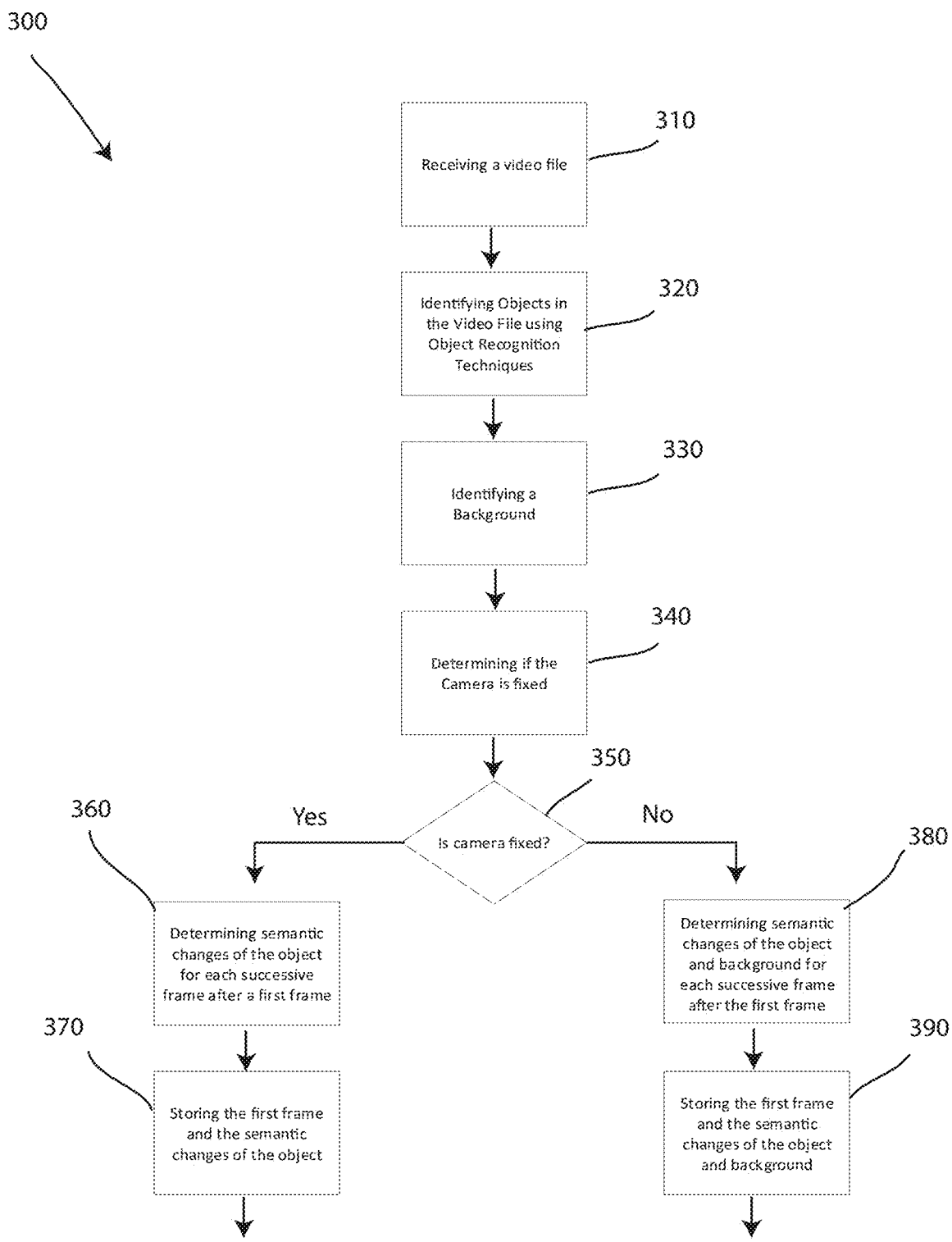
FIG. 6 depicts a method of video compression, in accordance with embodiments of the present invention.

FIG. 6 depicts a method 300 of video compression, in accordance with embodiments of the present invention. The method 300 may be performable by the video compression system 100 and/or the computer system 120 shown and described herein above, for example. The method 300 may include a first step of receiving, by one or more processors of a computer system such as the receiving and transmitting module 131 of the computer system 120, a video file including a plurality of frames, such as the frames 151, 152 or the frames 180*a*, 180*b*, 180*c*, 180*d*, 180*e*, 180*f*. The method 300 may include a second step 320 of identifying, by the one or more processors such as the identifying module 132 of the computer system 120, at least one object or objects, such as the object 150 using object recognition techniques, in each of the plurality of frames. The method 300 may include a third step 330 of identifying a background, such as the background 160 by the one or more processors, by for example the identifying module 132 of the computer system 120, in each of the plurality of frames. Thus, the method 300 may include identifying, by the one or more processors, at least one image feature, such as the object 150 or the background 160, in each of the plurality of frames. The method 300 may include determining, by the one or more processors such as the determining module 133 of the computer system 120, that a camera or other image capture device that captured the video file was moving or fixed during capture of the video file. A step 350 may include proceeding to steps 360 and 370 if the camera or other video capture device was determined to be fixed, and proceeding to steps 380 and 390 if the camera or other image capture device was determined to be moving.

If the camera or other video capture device is determined to be fixed, the method 300 may include a step 360 of determining, by the one or more processors, semantic changes of the object for each successive frame after the first frame. The method may include a next step 370 of storing, by the one or more processors, the sematic changes of the object for each successive frame after the first frame, such as the semantic change meta data 270.

If the camera is determined to be moving, the method 300 may include a step 370 of determining, by the one or more processors, semantic changes of the object and the background for each successive frame after the first frame. The method 300 may include a next step 370 of storing, by the one or more processors, the semantic changes of the object and the background for each successive frame after the first frame.

Thus, the methods described herein may include determining, by one or more processors, a semantic state change of the image feature for each successive frame after a first of the plurality of frames, and storing, by the one or more processors, the first of the plurality of frames and the semantic change of the image feature for each successive frame after the first of the plurality of frames.

Methods may further include using a template matching technique in the determining the semantic state change of the image feature within the frames of the video being compressed, or for each successive frame after the first of the plurality of frames. Methods may include extracting one or more common objects across multiple frames, for example, using an object recognition technique. Methods may further include decompressing a video file compressed using the methods described herein to create the plurality of frames of the original video file. This decompression may include taking a first of the plurality of frames, along with semantic changes and/or location information of the image features, including the background and each object or common object, for each successive frame after the first of the plurality of frames. Methods herein may be utilized in lossless compression and decompression of video files.

Figure 7:
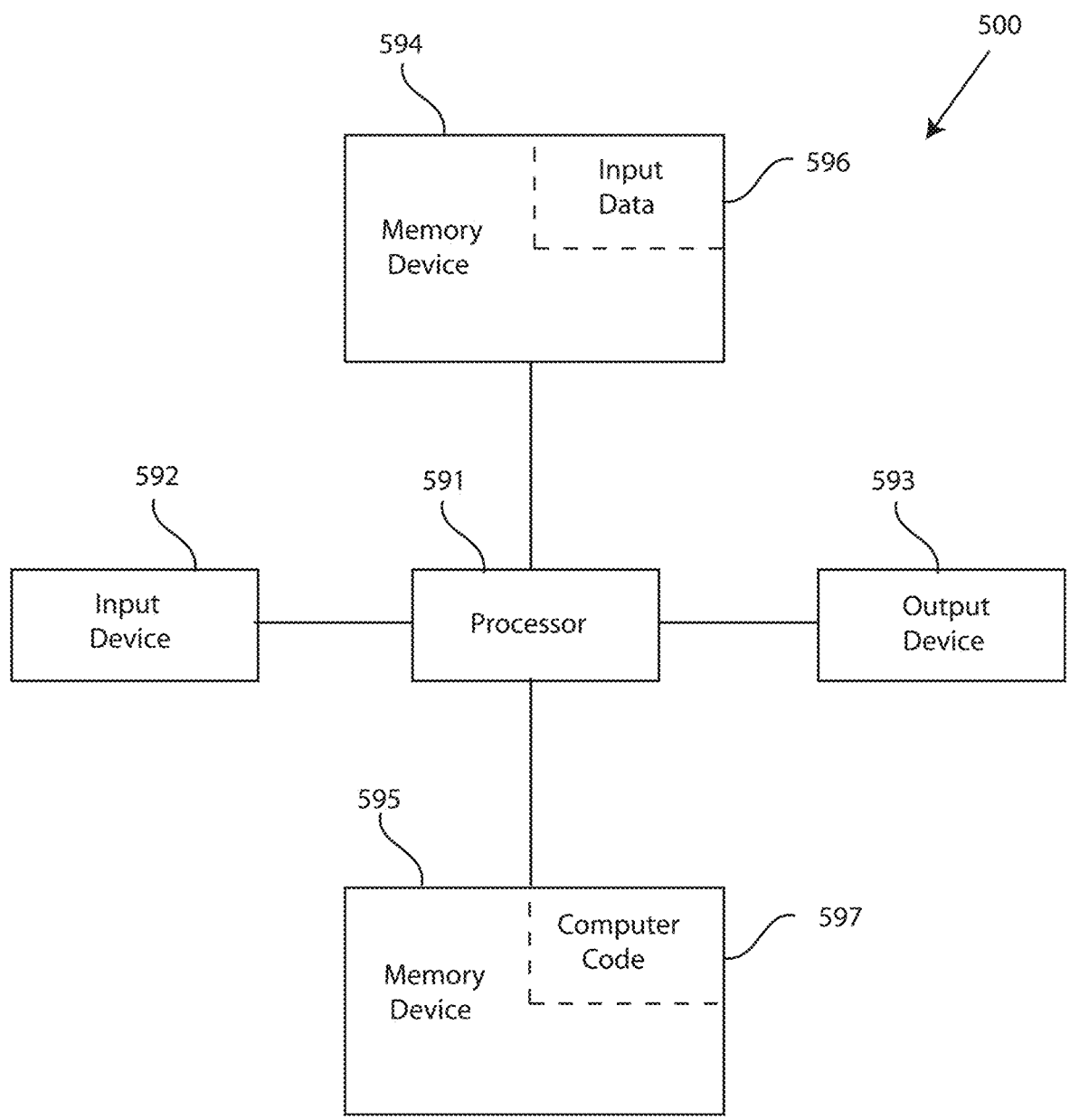
FIG. 7 depicts a block diagram of an exemplary computer system that may be included in the video compression system of FIG. 1, capable of implementing methods for video compression of FIGS. 3-6, in accordance with embodiments of the present invention.

FIG. 7 depicts a block diagram of an exemplary computer system that may be included in the video compression system of FIG. 1, capable of implementing methods for video compression of FIGS. 3-6, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for video compression in the manner prescribed by the embodiments of FIGS. 3-6 using the video compression system 100 of FIG. 1, wherein the instructions of the computer code 597 may be executed by processor 591 via memory device 595. The computer code 597 may include software or program instructions that may implement one or more algorithms for implementing the methods for video compression, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to identification validation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to perform the method video compression. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for video compression. Thus, the present invention discloses a process for supporting, deploying and/or integrating computer infrastructure, integrating, hosting, maintaining, and deploying computer-readable code into the computer system 500, wherein the code in combination with the computer system 700 is capable of performing a method for video compression.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Soft are as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
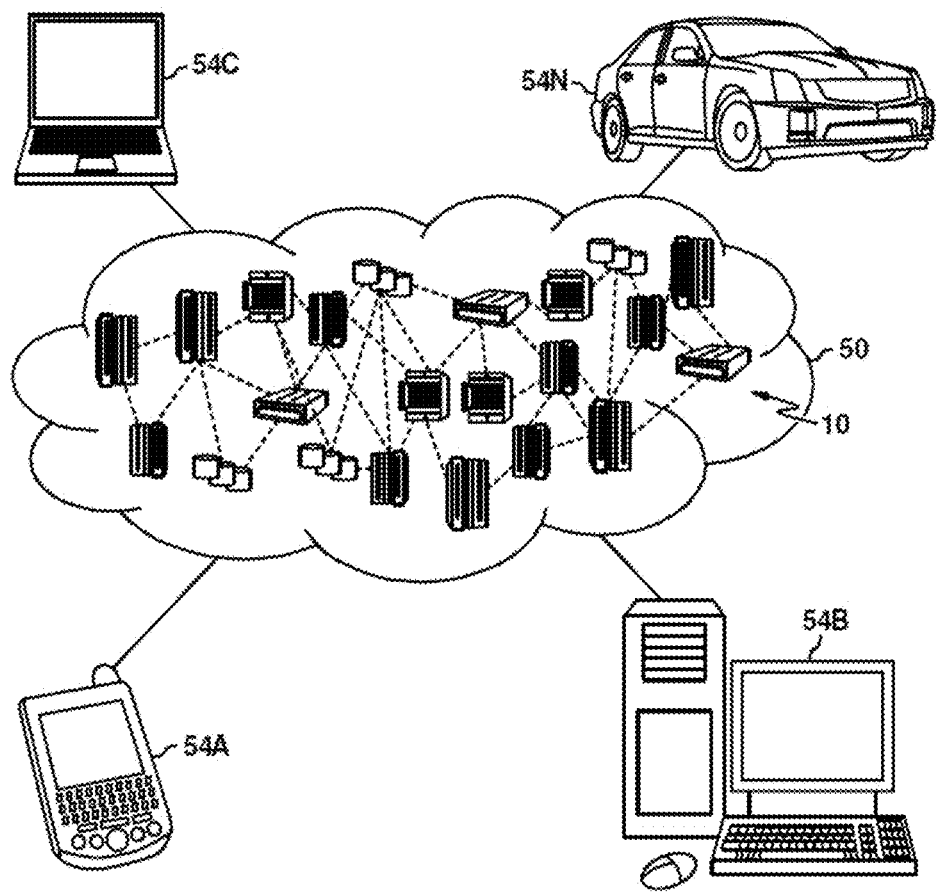
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers or users, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 9:
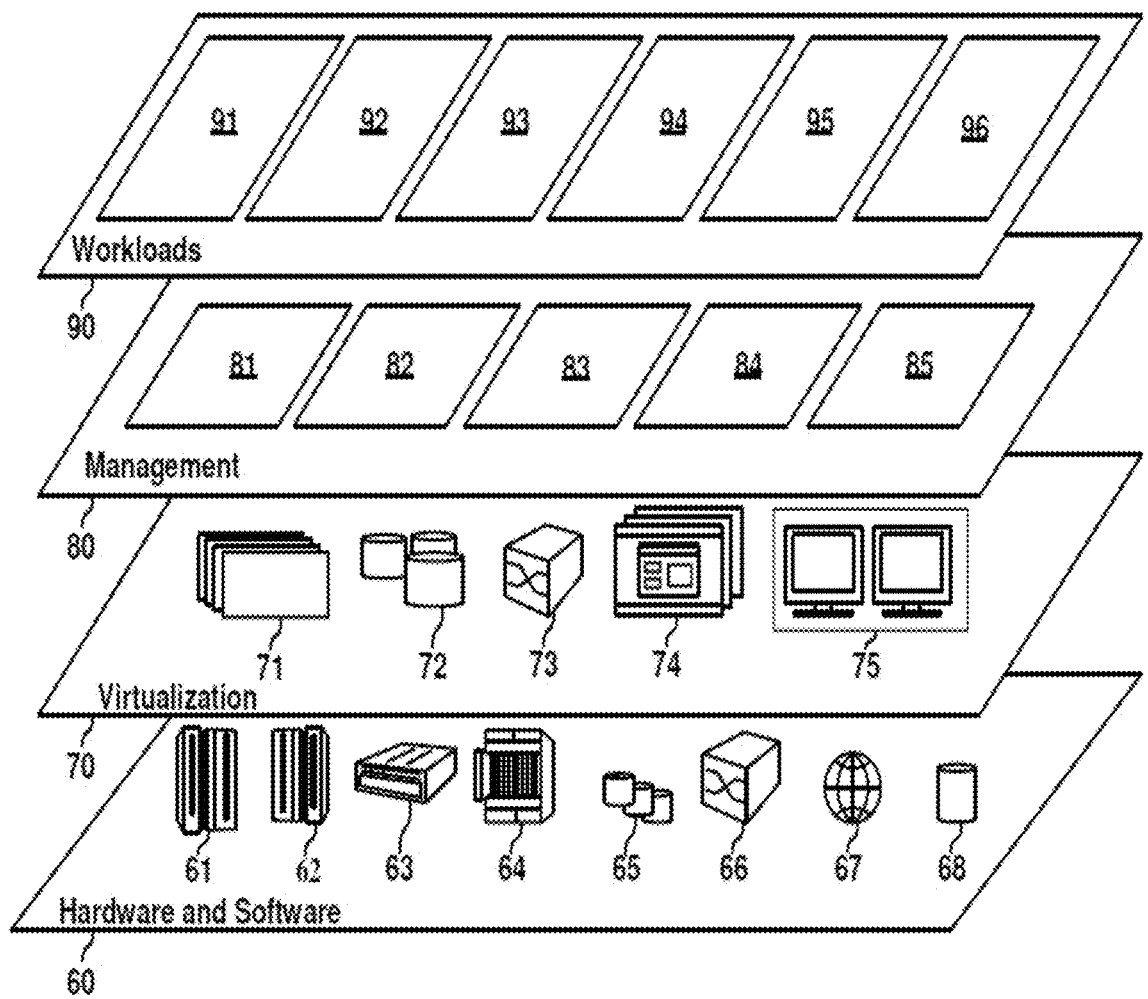
FIG. 9 depicts abstraction model layers, in accordance with embodiments of the present invention.

Referring now to FIG. 9, a set of functional abstraction layers provided by cloud computing environment 50 (see FIG. 8) are shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video compression 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for video compression, the method comprising:
    receiving, by one or more processors of a computer system, a video file including a plurality of frames;
    identifying, by the one or more processors, a background and at least one object in each of the plurality of frames;
    determining, by the one or more processors, location information associated with each of the background and the at least one object related to a location of the background and the at least one object within at least one of the plurality of frames;
    determining, by the one or more processors, whether a video capture device was moving or fixed during capture of the plurality of frames of the video file;
    if the video capture device was determined to be moving during the capture of the plurality of frames of the video file, determining, by the one or more processors, semantic changes of the object and the background for each successive frame after a first of the plurality of frames;
    if the video capture device was fixed during the capture of the plurality of frames of the video file, determining, by the one or more processors, semantic changes of the object for each successive frame after the first frame; and
    performing, by the one or more processors of the computer system, lossless video compression whereby only the location information of the background and the at least one object and the semantic changes of the background and the at least one object for each successive frame after the first of the plurality of frames are stored.

2. The method of claim 1, wherein each of the semantic changes is a change selected from the group consisting of a transition, a rotation, a position, an orientation and combinations thereof.

3. The method of claim 1, the method further comprising using a template matching technique in the determining the semantic changes of the background for each successive frame after the first of the plurality of frames.

4. The method of claim 1, wherein the identifying further comprises extracting, by the one or more processors, one or more common objects using an object recognition technique.

5. The method of claim 1, further comprising compressing an entirety of an image down to only location information and semantic change information in relation to a previous frame in the video file.

6. The method of claim 1, further comprising decompressing the video file to create the plurality of frames from the first of the plurality of frames and the semantic changes of the background and each of the one or more common objects for each successive frame after the first of the plurality of frames.

7. The method of claim 1, further comprising identifying each image feature in the video file and maintaining and storing original data for the image features found to be incapable of identification.

8. A computer system, comprising:
    one or more processors;
    one or more memory devices coupled to the one or more processors; and
    one or more computer readable storage devices coupled to the one or more processors, wherein the one or more storage devices contain program code executable by the one or more processors via the one or more memory devices to implement a method for video compression, the method comprising:
    receiving, by the one or more processors of a computer system, a video file including a plurality of frames;
    identifying, by the one or more processors, a background and at least one object in each of the plurality of frames;
    determining, by the one or more processors, location information associated with each of the background and the at least one object related to a location of the background and the at least one object within at least one of the plurality of frames;
    determining, by the one or more processors, whether a video capture device was moving or fixed during capture of the plurality of frames of the video file;
    if the video capture device was determined to be moving during the capture of the plurality of frames of the video file, determining, by the one or more processors, semantic changes of the object and the background for each successive frame after a first of the plurality of frames;
    if the video capture device was fixed during the capture of the plurality of frames of the video file, determining, by the one or more processors, semantic changes of the object for each successive frame after the first frame; and
    performing, by the one or more processors of the computer system, lossless video compression whereby only the location information of the background and the at least one object and the semantic changes of the background and the at least one object for each successive frame after the first of the plurality of frames are stored.

9. The computer system of claim 8, wherein each of the semantic changes is a change selected from the group consisting of a transition, a rotation, a position, an orientation and combinations thereof.

10. The computer system of claim 8, the method further comprising using a template matching technique in the determining the semantic change of the background for each successive frame after the first of the plurality of frames.

11. The computer system of claim 8, wherein the identifying further comprises extracting, by the one or more processors, one or more common objects using an object recognition technique.

12. The computer system of claim 8, the method further comprising compressing an entirety of an image down to only location information and semantic change information in relation to a previous frame in the video file.

13. The computer system of claim 8, the method further comprising decompressing the video file to create the plurality of frames from the first of the plurality of frames and the semantic changes of the background and each of the one or more common objects for each successive frame after the first of the plurality of frames.

14. The computer system of claim 8, the method further comprising identifying each image feature in the video file and maintaining and storing original data for the image features found to be incapable of identification.

15. A computer program product, comprising one or more non-transitory computer readable hardware storage devices storing a computer readable program code, the computer readable program code comprising an algorithm that when executed by one or more processors of a computing system implements a method for video compression, the method comprising:

receiving, by the one or more processors of a computer system, a video file including a plurality of frames;

identifying, by the one or more processors, a background and at least one object in each of the plurality of frames;

determining, by the one or more processors, location information associated with each of the background and the at least one object related to a location of the background and the at least one object within at least one of the plurality of frames;

determining, by the one or more processors, whether a video capture device was moving or fixed during capture of the plurality of frames of the video file;

if the video capture device was determined to be moving during the capture of the plurality of frames of the video file, determining, by the one or more processors, semantic changes of the object and the background for each successive frame after a first of the plurality of frames;

if the video capture device was fixed during the capture of the plurality of frames of the video file, determining, by the one or more processors, semantic changes of the object for each successive frame after the first frame; and performing, by the one or more processors of the computer system, lossless video compression whereby only the location information of the background and the at least one object and the semantic changes of the background and the at least one object for each successive frame after the first of the plurality of frames are stored.

16. The computer program product of claim 15, wherein each of the semantic changes is a change selected from the group consisting of a transition, a rotation, a position, an orientation and combinations thereof.

17. The computer program product of claim 15, the method further comprising using a template matching technique in the determining the semantic change of the background for each successive frame after the first of the plurality of frames.

18. The computer program product of claim 15, wherein the identifying further comprises extracting, by the one or more processors, one or more common objects using an object recognition technique.

19. The computer program product of claim 15, the method further comprising compressing an entirety of an image down to only location information and semantic change information in relation to a previous frame in the video file.

20. The computer program product of claim 19, the method further comprising identifying each image feature in the video file and maintaining and storing original data for the image features found to be incapable of identification.

* * * * *